(12) United States Patent
Verbowski

(10) Patent No.: US 11,318,806 B2
(45) Date of Patent: May 3, 2022

(54) 360 DEGREE ZERO CLEARANCE BI-SECTIONAL DAMPER ASSEMBLY

(71) Applicant: Larry Verbowski, Bay City, MI (US)

(72) Inventor: Larry Verbowski, Bay City, MI (US)

( * ) Notice: Subject to any disclaimer, the term of this patent is extended or adjusted under 35 U.S.C. 154(b) by 208 days.

(21) Appl. No.: 16/150,397

(22) Filed: Oct. 3, 2018

(65) Prior Publication Data

US 2020/0108683 A1    Apr. 9, 2020

(51) Int. Cl.
*B60G 21/055*    (2006.01)
*B62D 7/22*    (2006.01)

(52) U.S. Cl.
CPC ......... *B60G 21/0551* (2013.01); *B62D 7/228* (2013.01)

(58) Field of Classification Search
CPC ... B60G 21/0551; B62D 7/228; Y10T 403/66; F16B 7/04; F16B 7/0406; F16B 43/007
USPC ..... 248/638, 660, 662, 674, 27.1, 27.3, 608, 248/609, 610, 612, 300, 247, 248.1, 248/278.1; 411/539
See application file for complete search history.

(56) References Cited

U.S. PATENT DOCUMENTS

| | | | | |
|---|---|---|---|---|
| 597,947 A * | 1/1898 | Bragger | ............. | A24F 19/0092 248/230.4 |
| 838,923 A * | 12/1906 | Walker | .................. | F16M 11/04 248/662 |
| 1,452,492 A * | 4/1923 | Carpenter | ............. | F16B 43/007 411/532 |
| 2,358,606 A * | 9/1944 | Summers | .............. | F16B 43/007 411/539 |
| 2,662,988 A * | 12/1953 | McKim | ..................... | H02K 5/00 310/91 |
| 2,761,714 A * | 9/1956 | Cuskie | .............. | B60G 21/0551 403/225 |
| 3,683,453 A * | 8/1972 | McLeland | ............... | E05D 7/081 16/248 |
| 4,181,318 A * | 1/1980 | Applegate | ................ | B62D 7/22 267/150 |
| 4,213,626 A * | 7/1980 | Moore | ..................... | B62D 7/22 280/124.17 |
| 4,407,146 A * | 10/1983 | Nielsen, Jr. | ........... | F16B 41/005 285/80 |
| 4,441,684 A * | 4/1984 | Credle, Jr. | ............. | F16M 13/02 211/26 |
| 4,490,954 A * | 1/1985 | Cresti | ........................ | F16L 5/00 52/220.8 |
| 4,504,180 A * | 3/1985 | Ishii | ........................ | F16B 31/021 411/373 |
| 4,708,354 A * | 11/1987 | Moore | ..................... | B62D 7/22 267/150 |
| 4,875,703 A * | 10/1989 | Murakami | ............. | B60G 3/265 280/124.138 |
| 4,907,911 A * | 3/1990 | Rodriguez | ............ | F16L 55/179 405/184.2 |

(Continued)

OTHER PUBLICATIONS

BDS Suspension Co., Single Steering Stabilizer, Installation Instructions, Part No. 55379, Revised. Sep. 21, 2017.

*Primary Examiner* — Christopher Garft
*Assistant Examiner* — Michael McDuffie

(57) ABSTRACT

A combination of components forming a steering stabilizer mounting assembly including a stabilizer, a bracket shim, an independent hollow tubular housing with a fixedly attached base washer, and nuts and bolts to fasten the components into place.

1 Claim, 6 Drawing Sheets

(56) References Cited

U.S. PATENT DOCUMENTS

| | | | | |
|---|---|---|---|---|
| 4,991,868 A * | 2/1991 | VanDenberg | ............ | B60G 7/02 |
| | | | | 280/124.116 |
| 5,035,397 A * | 7/1991 | Yamada | ............... | B60K 5/1208 |
| | | | | 180/297 |
| 5,167,466 A * | 12/1992 | Hsieh | ....................... | B25B 5/003 |
| | | | | 403/385 |
| 5,251,932 A * | 10/1993 | Ide | ..................... | B60G 21/0551 |
| | | | | 280/784 |
| 5,417,401 A * | 5/1995 | Thompson | ............... | F24F 1/027 |
| | | | | 248/300 |
| 5,464,187 A * | 11/1995 | Linkner, Jr. | ............ | B60R 11/00 |
| | | | | 248/635 |
| 5,823,495 A * | 10/1998 | Joss | .................... | B60R 11/0205 |
| | | | | 248/309.1 |
| 5,944,298 A * | 8/1999 | Koike | .................... | F16F 1/3849 |
| | | | | 248/674 |
| 6,073,714 A * | 6/2000 | McHorse | ........... | B60G 21/0551 |
| | | | | 180/89.13 |
| 6,076,840 A * | 6/2000 | Kincaid | ................ | F16F 1/3842 |
| | | | | 267/188 |
| 6,244,553 B1 * | 6/2001 | Wang | ....................... | B60R 11/02 |
| | | | | 248/278.1 |
| 6,766,991 B1 * | 7/2004 | Nance | ..................... | F16M 7/00 |
| | | | | 248/215 |
| 7,111,854 B1 * | 9/2006 | Tuthill | ................... | B60G 11/24 |
| | | | | 280/789 |
| 7,942,078 B2 * | 5/2011 | Leimann | ............... | F16H 57/025 |
| | | | | 248/205.1 |
| 9,869,331 B2 * | 1/2018 | Muntasser | ................ | F16B 2/08 |
| 10,246,034 B2 * | 4/2019 | Malcom | ................ | B60R 16/0238 |
| 2005/0093364 A1 * | 5/2005 | Li | ........................ | B60B 35/003 |
| | | | | 301/124.1 |
| 2005/0251908 A1 * | 11/2005 | Doverspike | ............. | E03C 1/021 |
| | | | | 4/695 |
| 2008/0036166 A1 * | 2/2008 | Russell | .............. | B60G 21/0551 |
| | | | | 280/124.107 |
| 2008/0067727 A1 * | 3/2008 | Schwarz | ............... | F16F 1/3842 |
| | | | | 267/141.1 |
| 2009/0072099 A1 * | 3/2009 | Trotter | .................. | F16L 55/035 |
| | | | | 248/74.1 |
| 2012/0153118 A1 * | 6/2012 | Maier | ...................... | F16M 7/00 |
| | | | | 248/674 |
| 2013/0028547 A1 * | 1/2013 | Jang | .................... | B60G 21/0551 |
| | | | | 384/215 |
| 2014/0265076 A1 * | 9/2014 | Weger | ...................... | F16L 3/243 |
| | | | | 267/141 |
| 2015/0008305 A1 * | 1/2015 | Loeffelsender | ...... | B60K 5/1241 |
| | | | | 248/638 |
| 2015/0226372 A1 * | 8/2015 | Arai | ...................... | F16M 13/02 |
| | | | | 248/278.1 |
| 2017/0080772 A1 * | 3/2017 | Matsumura | ............. | F16F 1/373 |
| 2017/0203630 A1 * | 7/2017 | Seo | ...................... | B60G 21/055 |
| 2021/0146856 A1 * | 5/2021 | Larsson | ................ | F16B 37/062 |

\* cited by examiner

360 DEGREE ZERO CLEARANCE BI-SECTIONAL DAMPER ASSEMBLY

BACKGROUND OF THE INVENTION

Almost all automotive vehicles in use today are equipped with steering stabilizers as they leave the factory. The steering stabilizer is used to smooth out the steering on a vehicle using a damper means. The damper means is essentially a shock absorber that is mounted between the car body frame and the steering linkage/relay link.

One such single steering stabilizer known to the inventor herein is manufactured by BDS Suspension, Coldwater, Mich. The mounting assembly manufactured by them consists of a flat base plate having a stanchion built on its upper surface. Both ends of the base have an opening in it and these openings are used to bolt the assembly on one end to the control arm mount, and on the other end to a cross member frame of the vehicle. The cross member frame end requires that a threaded insert be put in the cross member, and then the base is bolted to the cross member by a threaded bolt that enlarges a sunken nut within the cross member, and by this means, the base is mounted on the cross member.

The problem with this arrangement is that the bolts have to be removed to remove the assembly and a large number of suspension parts of the vehicle have to be removed to remove the bolts. In addition, the insert tends to work loose and allow the tail end of the base to come unattached from the cross member frame, requiring disassembly and re-assembly of the entire area. The threaded insert also spaces the bracket away from the frame leaving an air gap which is less secure than the instant invention device.

THE INVENTION

Thus, what is disclosed and claimed herein is a combination of components forming a steering stabilizer mounting assembly. The assembly comprises a stabilizer bracket, wherein the stabilizer bracket comprises a flat plate having a midpoint, a near end, and a distal end. The stabilizer bracket has an opening through the near end and a first open notch through the distal end. There is a stanchion unitarily surmounted at the midpoint on a top surface of the stabilizer bracket. Each stanchion unit (that is, tabs) have a through hole in a distal end.

There is a bracket shim. The bracket shim has a washer configuration with a second open notch in the washer configuration. In addition, there is fixedly surmounted on an upper surface of the washer configuration, a plug for an opening in the second open notch.

There is mounted through the near end opening, a threaded bolt, and surrounding the threaded bolt is an independent hollow tubular housing, wherein a bottom edge of the independent hollow tubular housing contains a fixedly attached washer. There is a threaded nut on the threaded bolt.

DETAILED DESCRIPTION OF THE DRAWINGS

Figure 1:
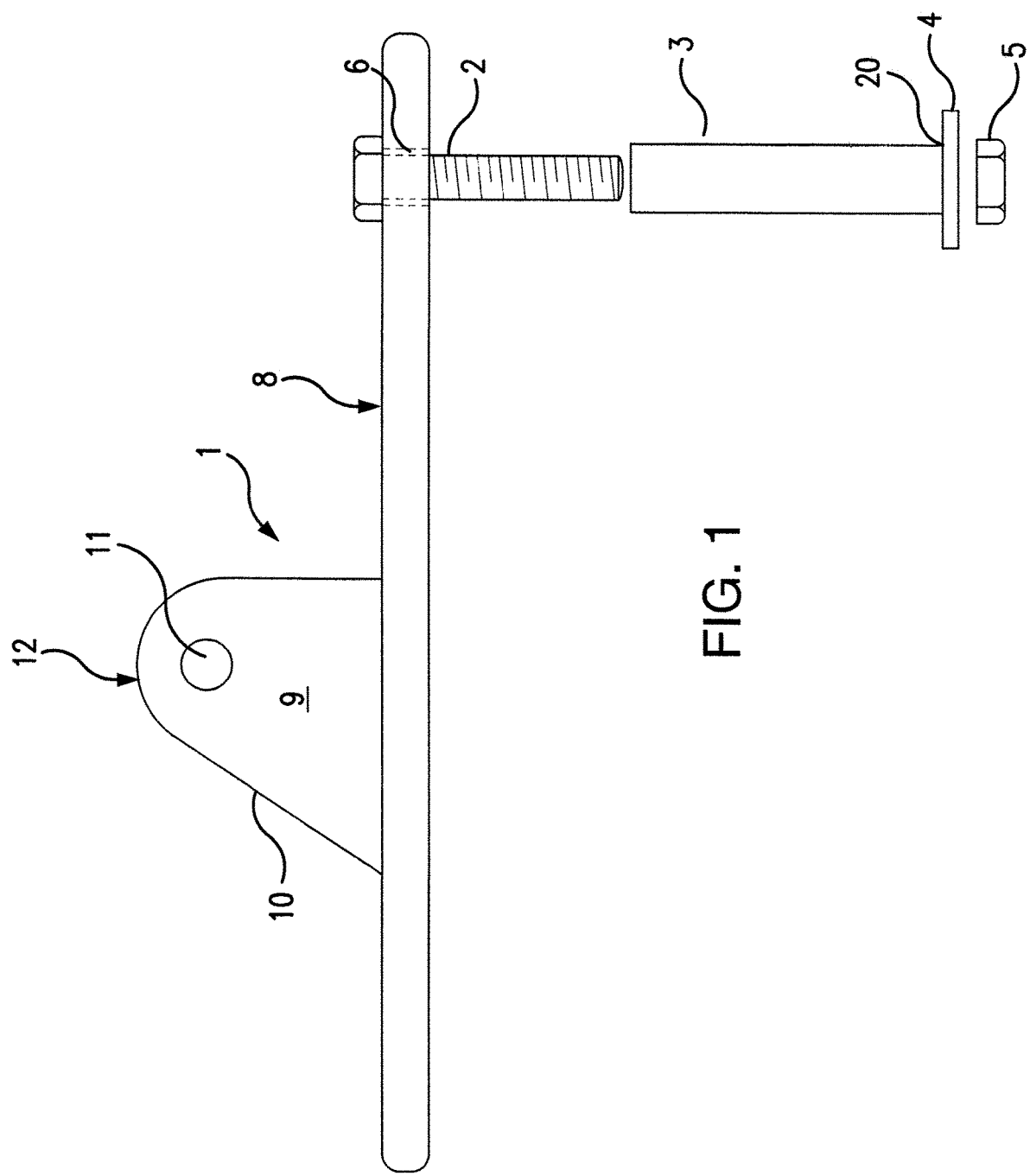
FIG. 1 is an exploded full top view of the stabilizer bracket in conjunction with a bracket shim.

Turning now to FIG. 1, there is shown a full side view of a combination of the stabilizer bracket 1 in conjunction with a bolt 2 and an independent hollow tubular housing 3 and washer 4. By "independent" as used herein, it means that the independent hollow tubular housing 3 is not attached to the stabilizer bracket 1 until the nut 5 is tightened on the bolt 2, at which time it becomes rigid. The bolt 2 is inserted through the opening 6 (shown in phantom).

It should be understood by those skilled in the art, that the bolt 2, with the independent housing 3 is inserted through a cross member 7 (FIG. 4) before being tightened. The washer 4 is fixedly attached to the bottom edge 20 of the independent housing 3 by welding or the like.

Figure 2:
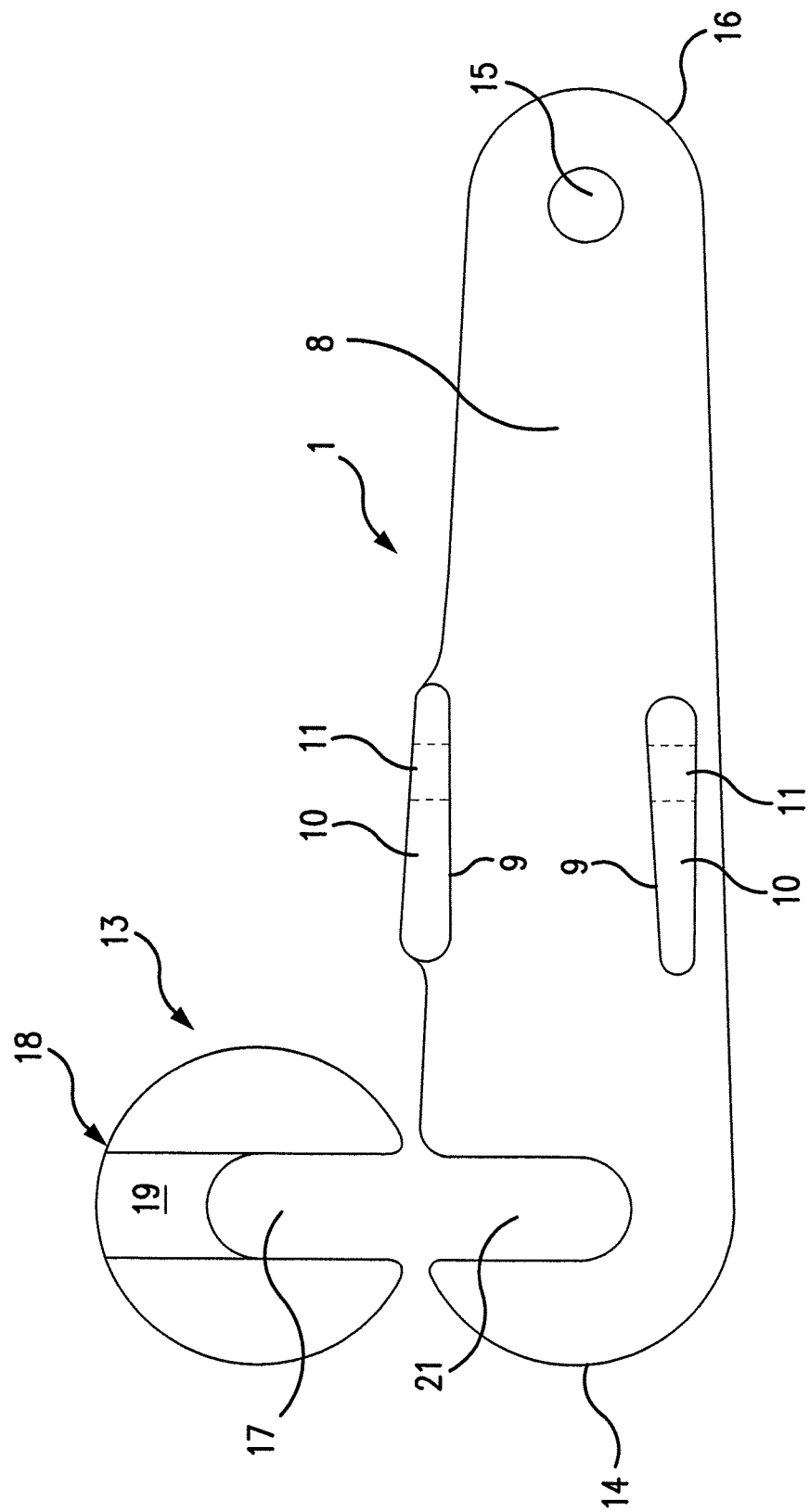
FIG. 2 is an exploded full side view of the stabilizer bracket in combination with the independent hollow tubular housing and washer.

The stabilizer bracket 1 has surmounted on its top surface 8, a stanchion 9, which consists of two separated tabs 10 (See FIG. 2). Each of the tabs 10 has an opening 11 near the top 12. In use, a bolt (not shown) is inserted through the openings 11 to allow the mounting of the stabilizer unit (not shown, not part of the invention) to the stabilizer bracket 1.

Turning now to FIG. 2, there is shown a full top view of the stabilizer bracket 1 in combination with the bracket shim 13. There is shown the tabs 10, the openings therein 11 (shown in phantom) and an opening 15 in the near end 16 for the independent hollow tubular housing 3.

Figure 6A:
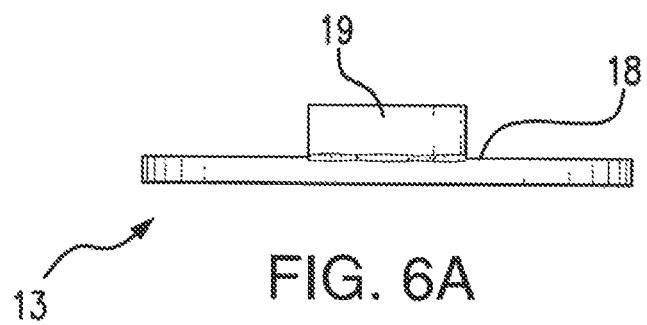
FIG. 6A is a back view of the shim 13.
Figure 6B:
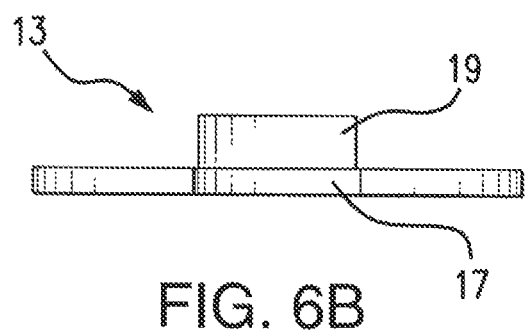
FIG. 6B is a full front view of the shim 13.

As can be noted from FIG. 2, the distal end 14 of the stabilizer bracket 1 has a notch 21 in it. In addition, as shown in FIG. 6B, the bracket shim 13 has an aligned notch 17 in it. Also shown is the raised portion 19. FIG. 6A is a full back view of the bracket shim 13. The outside edge 18 of the bracket shim 13 has mounted on its surface a plug 19, which plug provides an additional shim to the bracket shim 13, as in most cases, the cross member and the control arm mount are not at the same level as mounted in the vehicle.

Figure 3:
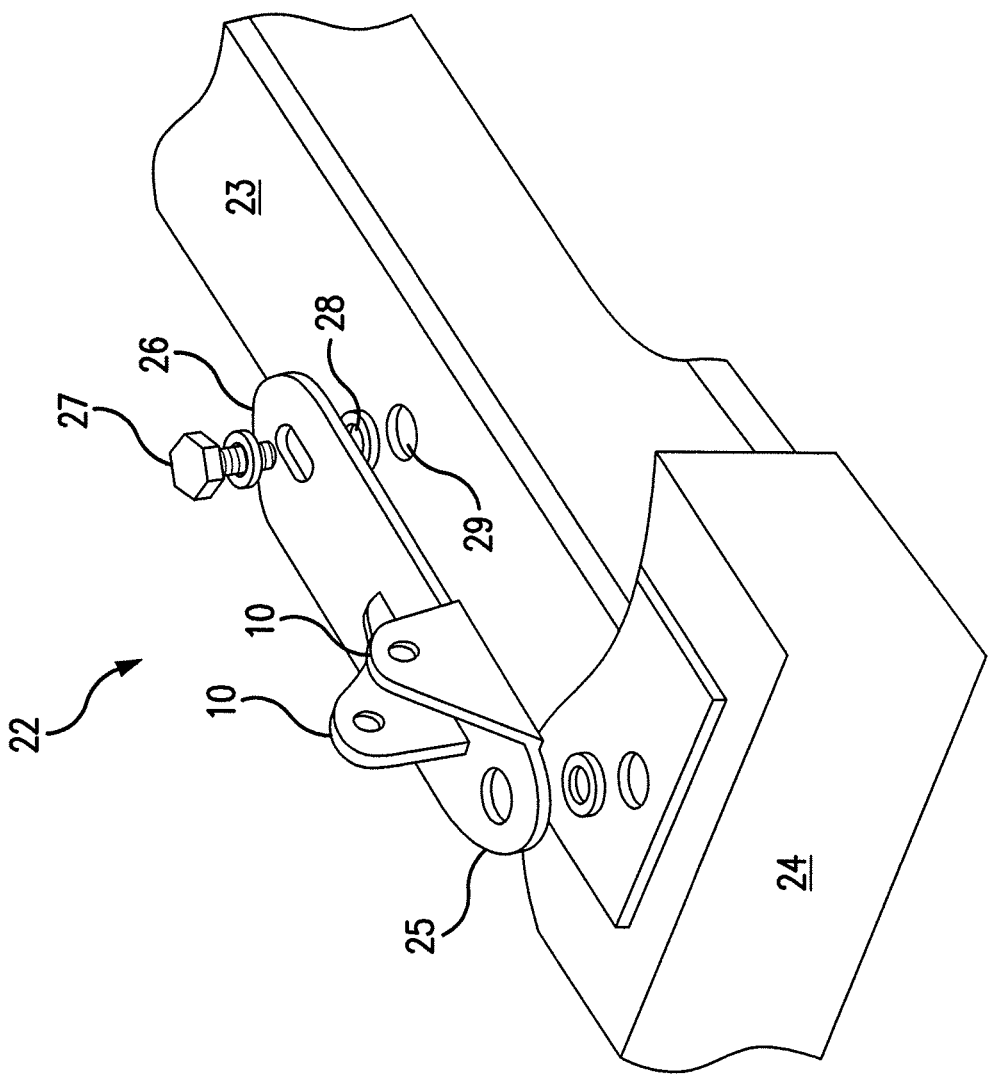
FIG. 3 is an illustration of a prior art device.

Turning now to FIG. 3, there is shown a prior art device 22 in readiness for mounting in a vehicle wherein 23 is a cross member of a body of a vehicle and 24 is a control arm mount in the vehicle.

The prior art device 22 does not have a notch in it at the distal end 25, and further, does not have a bracket shim associated with it. In addition, the near end 26 is comprised of a bolt 27 and an insert 28, that inserts in an opening 29 in the cross member 23. As suggested Supra, the problem associated with this device is that the vehicle has to be essentially disassembled in order to remove a bolt from the distal end attachment. Further, the insert 28 at the near end is only countersunk into the cross member 23 and thus can easily come unattached over time, requiring the disassembly and reassembly of the vehicle and unit to repair the unit.

Figure 4:
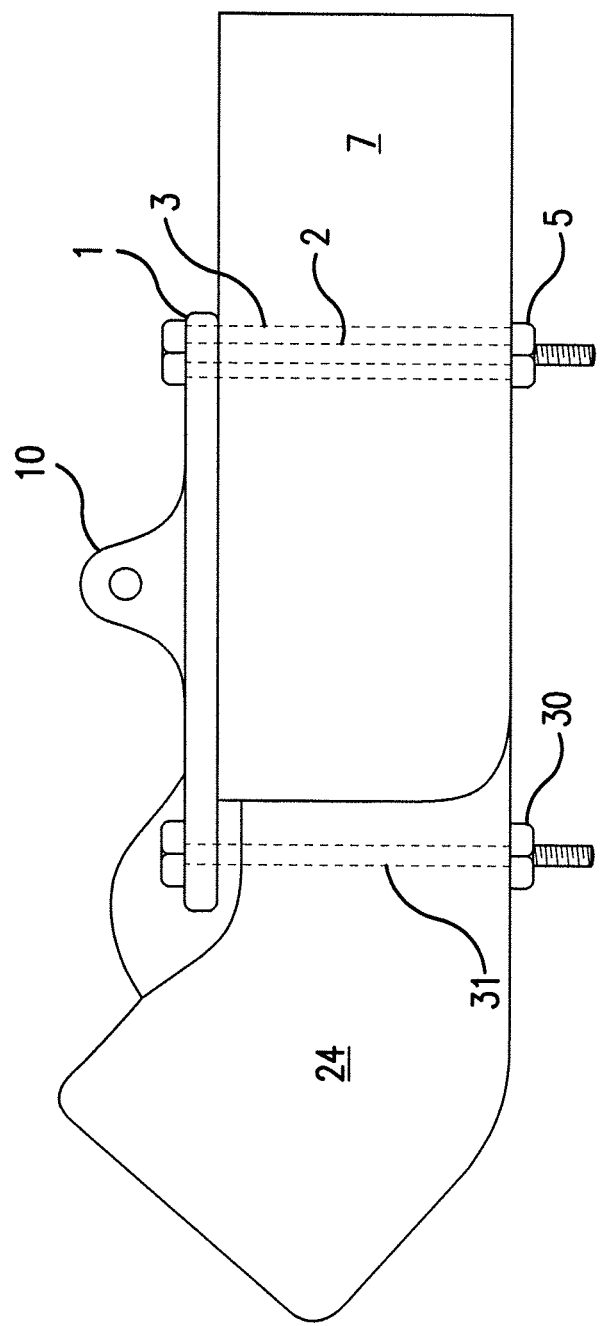
FIG. 4 is a full side view of a device of this invention connected to a body cross member and to a control arm mount.

In use, in order to repair the device 1 of the instant invention, as shown in FIG. 4, wherein 7 is the cross member of the vehicle, and 24 is the control arm mount, one loosens the back nut 5 to allow the device 1 to rotate around the bolt 2. Thereafter, the nut 30 is backed off of the bolt 31 and the bolt 31 is lightly tapped to take the pressure off of the stabilizer 1. Thereafter, the stabilizer 1 is withdrawn from around bolt 31.

Figure 5:
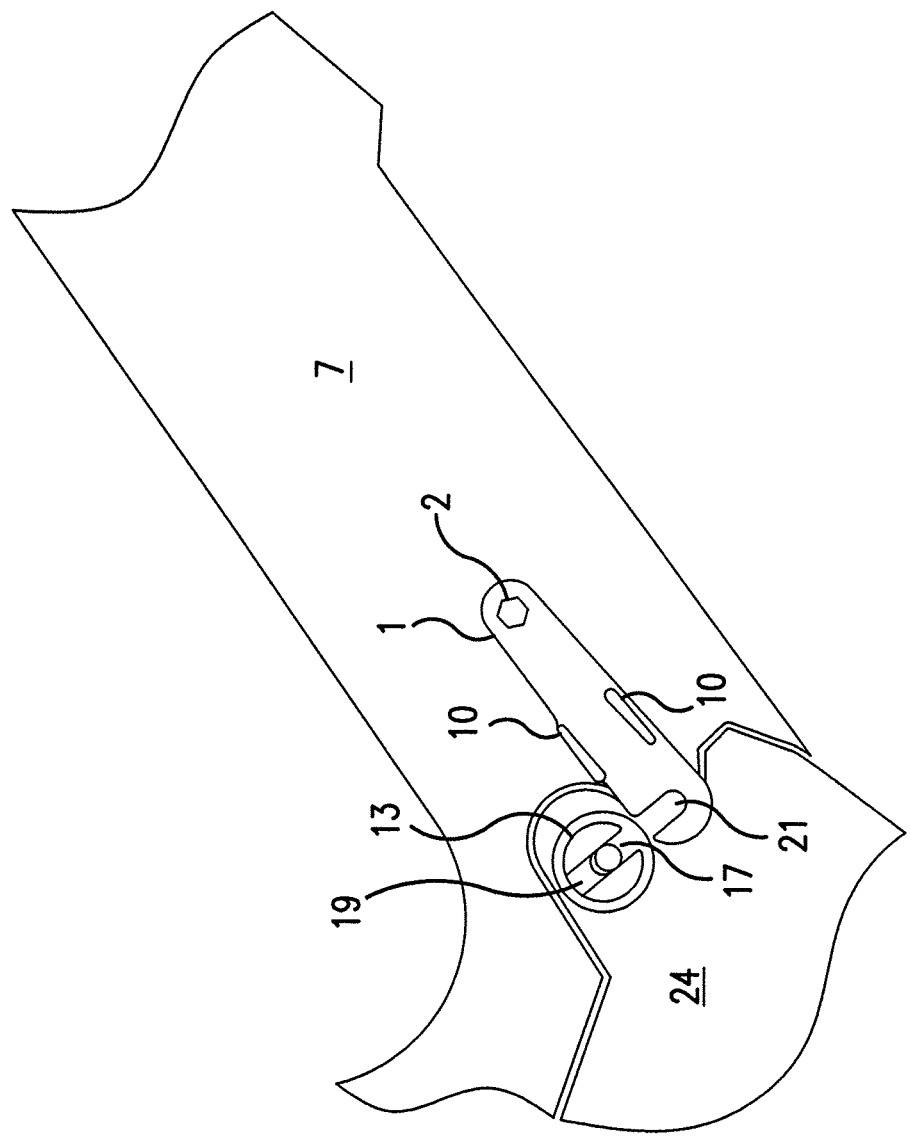
FIG. 5 is a full top view of the placement of the device of this invention on a cross member and control arm mount.

FIG. 5 is a full top view of the device 1 in place, ready to assemble.

All of the components of this device are manufactured from metals, and steel, cast iron and aluminum being preferred.

What is claimed is:

1. In combination, a steering stabilizer mounting assembly comprising:
   i. a stabilizer bracket, said stabilizer bracket comprising a flat plate having a midpoint, a near end, and a distal end, said stabilizer bracket having an opening through said near end and a first open notch through said distal end, there being a stanchion unitarily surmounted at said midpoint on a top surface, said stanchion unit having a through hole in a distal end;
   ii. a bracket shim, said bracket shim having a washer configuration with a second open notch in said washer configuration, which second open notch opposes said first open notch when in use, there being fixedly surmounted on an upper surface of said washer configuration, a plug for an opening in said second open notch, creating a closed opening to said second notch;
   iii. a threaded bolt mounted through said near end opening, and an independent hollow tubular housing surrounding said threaded bolt, a bottom edge of said independent hollow tubular housing containing a fixedly attached washer, there being a threaded nut on said threaded bolt affixed perpendicular to said stabilizer bracket.

* * * * *